(12) United States Patent
McKee

(10) Patent No.: US 8,024,957 B2
(45) Date of Patent: Sep. 27, 2011

(54) DOWNHOLE LOAD CELL

(75) Inventor: L. Michael McKee, Friendswood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 658 days.

(21) Appl. No.: 12/042,900

(22) Filed: Mar. 5, 2008

(65) Prior Publication Data

US 2008/0216554 A1 Sep. 11, 2008

Related U.S. Application Data

(60) Provisional application No. 60/893,543, filed on Mar. 7, 2007.

(51) Int. Cl.
G01L 25/00 (2006.01)
G01L 5/04 (2006.01)
E21B 47/04 (2006.01)
E21B 47/06 (2006.01)
E21B 47/00 (2006.01)

(52) U.S. Cl. ........... 73/1.15; 73/152.02; 73/152.52; 73/152.59; 702/6; 702/104

(58) Field of Classification Search ............ 73/1.15, 73/152.02, 152.12, 152.52–152.53, 152.59, 73/FOR. 102; 702/6, 43, 104, FOR. 102, 702/FOR. 126, FOR. 157–FOR. 159, FOR. 162
See application file for complete search history.

(56) References Cited

U.S. PATENT DOCUMENTS

| | | | |
|---|---|---|---|
| 2,308,668 A | 1/1943 | Barstow | |
| RE24,818 E * | 4/1960 | Gresham et al. | 254/273 |
| 3,490,150 A * | 1/1970 | Whitfill, Jr. | 73/152.02 X |
| 3,677,081 A | 7/1972 | Newton et al. | |
| 4,117,600 A * | 10/1978 | Guignard et al. | 702/6 X |
| 4,267,727 A | 5/1981 | Hoppe | |
| 4,909,321 A | 3/1990 | Petree | |
| 4,997,041 A | 3/1991 | Petree | |
| 4,997,384 A | 3/1991 | Godfrey et al. | |
| 5,109,921 A | 5/1992 | Aracena | |
| 5,167,490 A * | 12/1992 | McKee et al. | 417/12 |
| 5,278,550 A | 1/1994 | Rhein-Knudsen et al. | |
| 5,351,531 A * | 10/1994 | Kerr | 73/152.54 |
| 5,358,418 A | 10/1994 | Carmichael | |
| 5,363,921 A | 11/1994 | Mendez | |
| 5,568,836 A | 10/1996 | Reid | |
| 6,032,733 A | 3/2000 | Ludwig et al. | |
| 6,216,533 B1 | 4/2001 | Woloson | |
| 6,450,259 B1 | 9/2002 | Song | |
| 7,533,724 B2 * | 5/2009 | McLaughlin | 166/301 |
| 7,793,712 B2 * | 9/2010 | Yamate et al. | 73/152.02 X |
| 2005/0103123 A1 | 5/2005 | Newman | |
| 2005/0230108 A1* | 10/2005 | Mackenzie et al. | 166/250.01 |
| 2010/0193246 A1* | 8/2010 | Grayson et al. | 175/45 |

FOREIGN PATENT DOCUMENTS

CN 201277026 Y * 7/2009
SU 471520 A * 9/1975

* cited by examiner

Primary Examiner — Thomas P Noland
(74) Attorney, Agent, or Firm — Michael Flynn; David Hofman; Jody Lynn DeStefanis

(57) ABSTRACT

A downhole load cell calibrated for enhanced accuracy. The load cell may be a dry load cell calibrated by storage of pre-determined temperature and pressure data relative to the load cell based on known loads applied thereto. Thus, surface equipment employed with the load cell may include a computer program that takes advantage of the stored pre-determined information. The computer program may then be employed for calibration of downhole load cell data based on readings from the load cell along with downhole temperature and pressure information.

16 Claims, 5 Drawing Sheets

DOWNHOLE LOAD CELL

CROSS REFERENCE TO RELATED APPLICATION(S)

This Patent Document claims priority under 35 U.S.C. §119(e) to U.S. Provisional Application Ser. No. 60/893,543, entitled Dry Load Cell, filed on Mar. 7, 2007, which is incorporated herein by reference.

FIELD

Embodiments described relate to load cells for use in measuring a load in the form of tension or compression on a well access line at a downhole location within a well. In particular, load cells configured for determining tension or compression at the downhole end of coiled tubing or a wireline are detailed.

BACKGROUND

Exploring, drilling, completing, and operating hydrocarbon and other wells are generally complicated, time consuming and ultimately very expensive endeavors. In recognition of these expenses, added emphasis has been placed on information available for each stage of well completion and operation. From early seismic data to logging and profiling of the well to the continuous monitoring of well conditions throughout the life of the well, available well information plays a critical role in cost effective hydrocarbon recovery efforts.

In addition to the condition of the well itself, accurate information regarding downhole tools employed during well intervention is also of critical importance. For example, coiled tubing, wireline, and other downhole well applications involve the directing of downhole tools through the depths of the well. In many cases, the well may be of extreme depths, of a highly deviated nature, or involve other challenging characteristics making direct information regarding the downhole tool difficult to ascertain. For example, in a logging application, surface equipment at an oilfield may be used to deliver a logging head several thousand feet into a well by use of a wireline. Certain information regarding the wireline itself may be available through readings of the wireline taken at the surface. The amount of wireline disposed into the well or the tension imparted on the wireline may be measured at the surface. However, these readings may not constitute a true indication as to the depth to which the logging head has actually been disposed within the well nor the amount of tension imparted on the wireline downhole, at the location of the logging head. Such inaccurate or incomplete information may be adverse to the logging application. Inaccurate knowledge of downhole wireline tension at the logging head in particular may be catastrophic to the logging application. Unintentional breaking of the wireline at the logging head or a perceived inability to affect the depth or position of the logging head may result.

In order to help provide some level of accuracy regarding wireline tension at a downhole location of the logging head, a load cell is generally incorporated into a logging head or other tool at the end of the wireline. The load cell generally includes a strain gauge assembly configured to detect tension and electrically transmit tension readings uphole through the wireline. In this manner, direct readings of tension at the location of the logging head may be processed by uphole equipment and used in directing the logging application.

Unfortunately, the accuracy of the load cell is limited for reasons such as the downhole pressure of the well environment. That is, well pressure may increase significantly deeper and deeper within the well. However, certain load cells may remain isolated within the logging head, safeguarded from exposure to the harmful downhole environment. As a result, readings obtained by this type of load cell may fail to provide a true and accurate measurement of tension at the downhole location of the logging head within the well.

In order to address the inaccuracy of tension measurements provided by a load cell as indicated above, the load cell may instead be a 'wet load cell'. That is, the load cell may be provided within a pressurizable, oil-filled chamber of the logging head. In such a situation, the pressurizable chamber within the logging head may be affected by movement of a piston in response to an influx of pressure at the other side of the piston. That is, the logging head may be configured to intentionally allow an influx of pressure at one side of a piston, whereas the other side of the piston may define the chamber housing the load cell. As such, the pressure within the chamber housing the load cell may be altered to roughly match the pressure of the outside well environment. Thus, in theory, a more reliable reading of tension at the location of the logging head may be obtained and transmitted uphole by the load cell.

Unfortunately, there remain significant limitations to the use of a wet load cell to provide downhole tension information as described above. Namely, while providing some degree of additional accuracy as compared to a load cell unaffected by downhole pressure, even a wet load cell has a significant degree of inaccuracy. For example, a wet load cell configuration may provide a degree of tension measurement accuracy to within no more than about +/−3%. While this may be sufficient for smaller load cells in wells of limited depths, a tension measurement error of 3% for a several thousand pound load cell in a deep well may amount to error in the neighborhood of several hundred pounds of load. Furthermore, the nature of the wet load cell involves exposure of strain gauges to oil as described above. As such, the useful life of the gauges and the load cell itself is generally in the neighborhood of about a year.

SUMMARY

A downhole load cell is provided for acquiring downhole load data relative to a downhole location in a well at an oilfield. The downhole load cell may include a strain gauge for detecting transverse load relative to the well as well as another for detecting axial load. Additionally, the downhole load cell may be configured for coupling to surface equipment at the surface of the oilfield which includes a computer program for calibrating the downhole load data based on stored pre-determined data relative to the downhole load cell.

DETAILED DESCRIPTION

Embodiments are described with reference to certain logging tools and procedures at a hydrocarbon well. For example, the embodiments depicted herein include a well access assembly line that employs a downhole load cell in conjunction with wireline delivery of a host of downhole tools. However, alternate modes of downhole delivery may be employed as well as a host of additional downhole tools, in addition to those described herein. Regardless, embodiments of downhole load cells and calibration techniques therefor, are described that may be employed for enhancing downhole well applications. Additionally, the well is referred to herein as at an "oilfield". The term "oilfield" is meant to reference any geologic field from which hydrocarbon exploration or production may be sought. This may include land fields, sub-sea locations and others.

Figure 1:
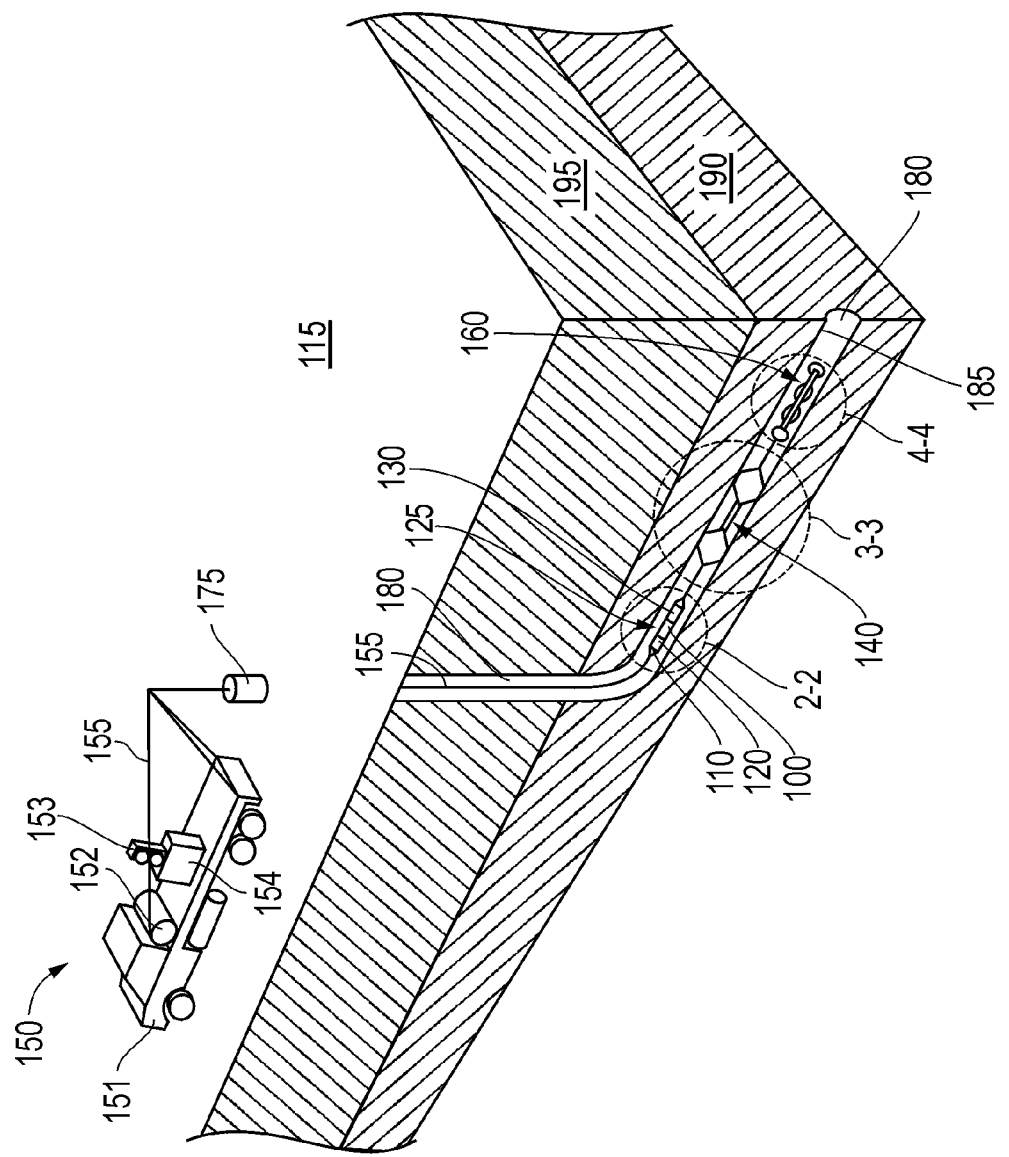
FIG. 1 is an overview of an oilfield with a well access assembly line employing an embodiment of a downhole load cell.

Referring now to FIG. 1, an overview of an oilfield 115 is depicted. In this figure, a deviated hydrocarbon well 180 is shown through formation layers 195, 190 of the oilfield 115. A well access assembly line is disposed through the well 180. In the embodiment shown, this line includes a wireline 155 delivery mechanism for delivering a logging head 125 and logging tool 160 downhole within the well 180. A tractor 140 may also be present to help advance the assembly through the well 180 when it is of a challenging architecture. However, in other embodiments, the well access assembly line may include a variety of different or additional tools or even employ coiled tubing as the delivery mechanism through the well 180. Regardless, as detailed further below, the effectiveness of operations at the well 180 may be enhanced by employment of load cell calibration embodiments applied to a load cell 100 of the logging head 125.

Continuing with reference to FIG. 1, the well access assembly line is configured for performance of a logging operation with the logging tool 160 to determine a variety of characteristics of the well 180. As described further below, such an operation may be undertaken to help build or update an overall profile of the well 180 relative to pressure, temperature, and other obtainable downhole data. In order to obtain the data, surface equipment 150 may be utilized to position the tool 160 within the well 180. In particular, a winch 152 supported by a conventional wireline truck 151 may be used to drop the tool 160 and other equipment into the well 180. Additionally, in the case of a horizontal well 180 as shown, a tractor 140 of the assembly line may be employed to interface the well wall 185 and further position the logging tool 160 and other equipment downhole.

As the logging tool 160 and other equipment is positioned downhole as indicated, the wireline 155 may be run through a surface load-measurement device 153. As depicted, the surface load-measurement device 153 may include a wheel assembly to physically track and monitor the amount of load, in terms of tension and/or compression, that is imparted on the wireline 155 by the winch 152, the tractor 140, the weight of the assembly itself, or other factors. This load information may be of significant relevance to the logging operation, depending on load tolerances of the individual wireline 155. Thus, the information may be directed to a control unit 154 and a computer program for analysis and potential adjustment to parameters of the logging operation.

The load data described above is obtained from the surface load-measurement device 153 which is positioned at the surface of the oilfield 115 near the beginning of the exit of the wireline 155 from the winch 152. As such, this load data may be referred to herein as surface load data. While this surface load data may be of significant operational importance, it may vary to a degree from the actual load which is imparted on the downhole equipment. This may be especially true for circumstances in which the downhole equipment is positioned at extreme well depths or within a highly deviated or horizontal well 180 (as shown). In such circumstances, the difference between the detectable surface load data and load data detected by the downhole load cell 100 (i.e. downhole load data) may be quite significant.

For example, depending on the tortuous nature of the well 180, potential obstructions, the extreme depths involved, or other factors, the load detected by the surface load-measurement device 153 may differ from the load detected by the downhole load cell 100 by several hundred pounds. Thus, to avoid reliance solely upon surface load data, a more direct and real-time measurement of downhole load data may be obtained directly from the downhole load cell 100. The downhole load cell 100 may supply the downhole load data directly to the control unit 154 over the wireline 155 as needed. In this manner, the control unit 154 may account for varying loads at varying downhole locations throughout the assembly. Thus, the likelihood of catastrophic failure, damage to downhole equipment, or failure to properly complete the downhole operation based solely on indirect surface load data may be reduced.

In addition to eliminating reliance on surface measurements as the sole source of load data, the downhole load cell 100 may be configured for calibration in such a manner as to substantially enhance the accuracy of the downhole load data to within less than about a 3% error range. Thus, the likelihood of failure to properly complete the operation may be further reduced. This enhanced accuracy of the downhole load data may be achieved through the employment of temperature and pressure data utilized in conjunction with the downhole load cell 100 and features thereof as described further below.

Figure 2:
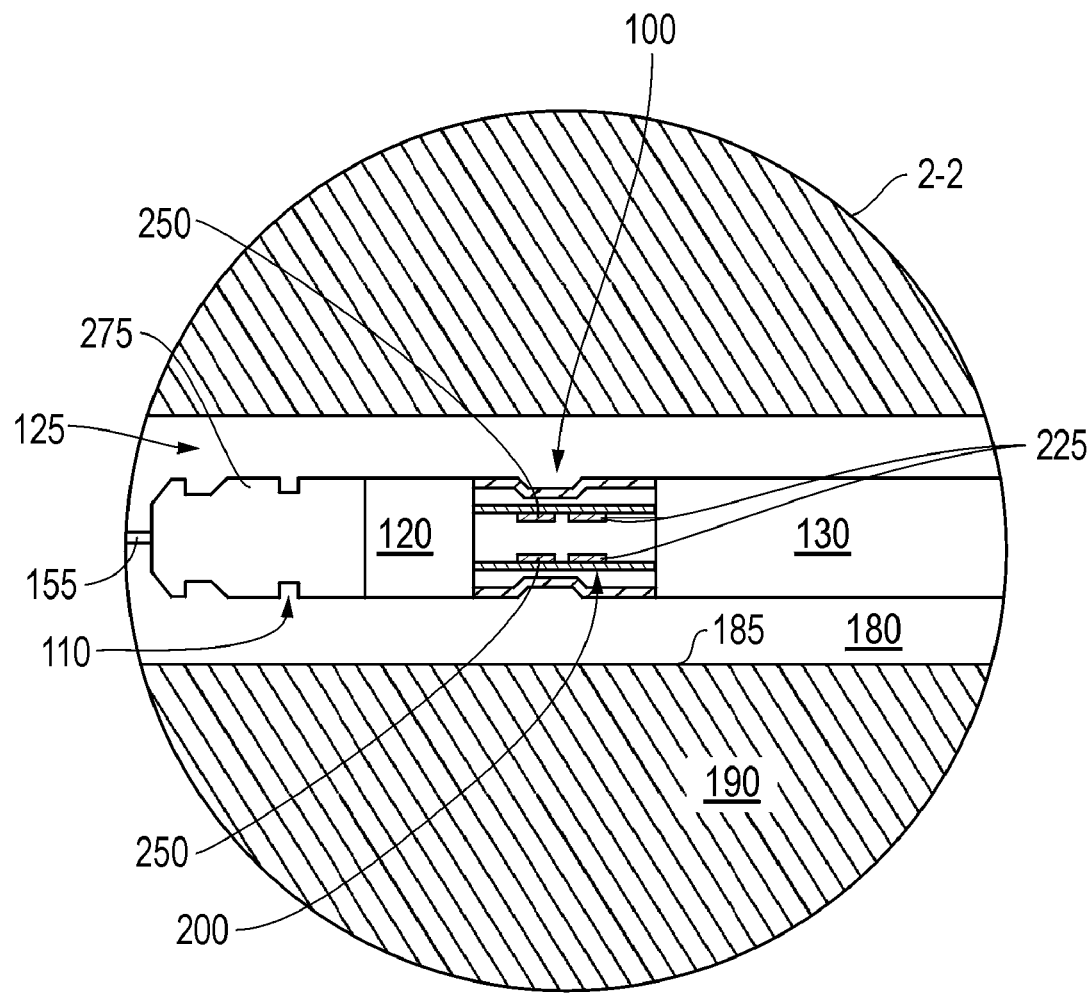
FIG. 2 is an enlarged view, taken from 2-2, of an embodiment of a logging head accommodating the downhole load cell of the well access assembly line of FIG. 1.

Continuing now with reference to FIGS. 1 and 2, the logging head 125 is equipped with the noted downhole load cell 100 disposed between a thermometer housing 120 and a bulkhead 130. The logging head 125 also includes a fish-neck assembly 275 where the wireline 155 is coupled to the logging head 125. A weakpoint 110 may be incorporated into the fish-neck assembly 275 to allow de-coupling of the wireline 155 from the logging head 125 once a predetermined amount of load or tension arises thereat.

Figure 4:
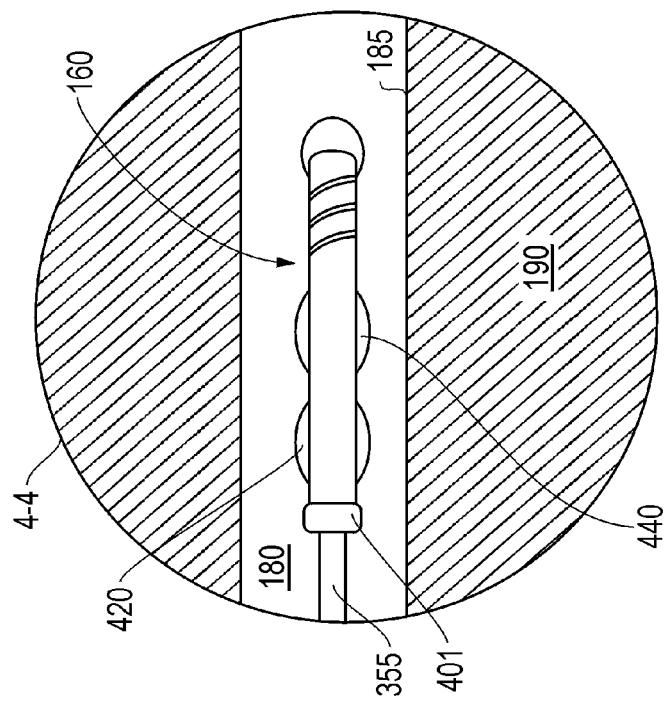
FIG. 4 is an enlarged view, taken from 4-4, of an embodiment of a logging tool of the well access assembly line of FIG. 1.
Figure 3:
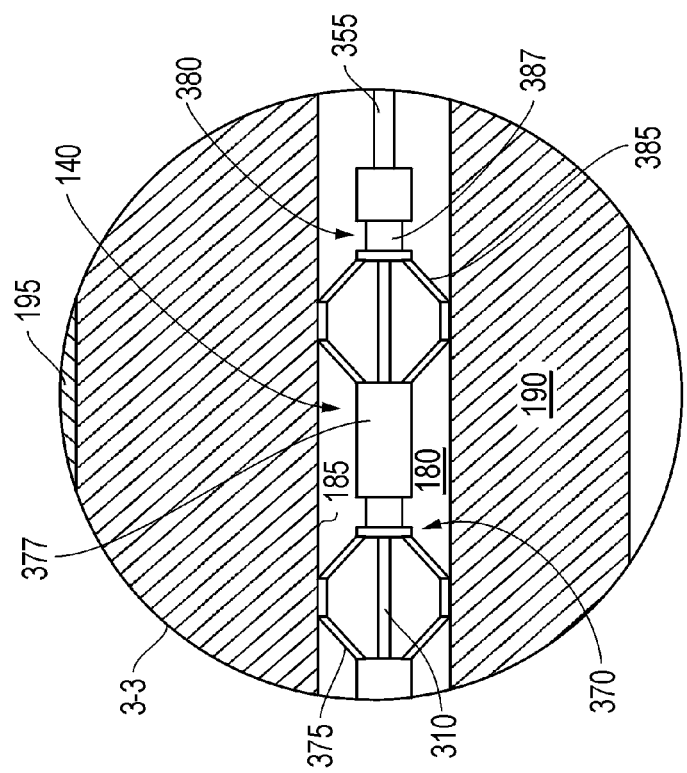
FIG. 3 is an enlarged view, taken from 3-3, of an embodiment of a tractor of the well access assembly line of FIG. 1.

In addition to the enlarged view of a logging head 125 depicted in FIG. 2, enlarged views of other portions of the well access assembly line are shown in FIGS. 3 and 4. Namely, an enlarged view of the tractor 140 is depicted in FIG. 3 whereas an enlarged view of the logging tool 160 is depicted in FIG. 4. This equipment is described in greater detail further below. However, of particular note here is the coupling of the tractor 140 to both the logging tool 160 and the logging head 125 in order to aid positioning of the assembly through the well 180 for the logging application. During this positioning, a load may be imparted at the above noted weakpoint 110, which, if not properly accounted for may result in premature termination or compromising of the application as also detailed further below.

Returning to FIG. 2, the enlarged view of the logging head 125 is shown with the downhole load cell 100 depicted in a cross sectional manner. A load cell chamber 200 is revealed within the load cell 100 portion of the assembly. The load cell chamber 200 may be a dry and isolated space for housing a plurality of strain gauges 225, 250. Thus, the downhole load cell 100 may be referred to as a "dry" load cell. Employment of a dry chamber 200 in this manner may extend the life of the load cell 100 as opposed to circumstances in which an oiled chamber is utilized which allows exposure of the gauges 225, 250 to oil. However, due to the dry and isolated nature of the load cell chamber 200, a disparity exists between pressure within the chamber 200 and pressure from the surrounding environment of the well 180. Thus, the strain gauges 225, 250 may be oriented as described below, so as to offset this disparity to a degree when determining the downhole load at the downhole load cell 100.

As depicted in FIG. 2, the above noted orientation of the strain gauges 225, 250, is such that there are axial strain gauges 225 and transverse strain gauges 250. Thus, in the embodiment shown, radial or "hoop" stress may be accounted for with transverse strain gauges 250 independent of the axial strain gauges 225. As such, the effect of hoop stress, largely due to the disparity in pressure between the chamber 200 and the well 180, may be known. In this manner, the load calculated by the control unit 154 may account for and offset hoop stress to a degree in order to provide a more accurate accounting of the true downhole load.

While the above orientation of strain gauges 225, 250 may be leveraged to enhance the accuracy of the determined downhole load to a degree, additional measures may be taken to further enhance this accuracy to within a 3% error range suited to ever increasing well depths. That is, as increasing well depths are accessed in hydrocarbon recovery efforts, the value of improved accuracy solely based on the use of a dry load cell with particularly oriented strain gauges 225, 250 may diminish. Furthermore, the amount of equipment, length of the wireline 155, and size of the load cell 100 may increase as deeper and deeper well access is sought. Thus, the effect of even minimal inaccuracies may be magnified. For example, a potential 3% inaccuracy in a 5,000 lb. load cell equates to an accuracy of +/−150 lbs., whereas for a 10,000 lb. load cell, the same degree of potential inaccuracy amounts to an accuracy of +/−300 lbs.

Continuing now with reference to FIG. 2, calibration techniques employing downhole temperature and pressure information may be applied to data acquired from the downhole load cell 100 to further enhance its accuracy. For example, a data table of predetermined pressure and temperature information unique to the load cell 100 may be established. In this embodiment, the load cell 100 may be tested in a controlled setting in advance of a downhole application such as that depicted in FIG. 1. In this setting, a known load may be applied to the load cell 100 at a variety of temperatures and pressures.

The load detected by the load cell 100 may then be compared to the known load to determine a degree of inaccuracy at the given temperatures and pressures. This same check may subsequently be performed at a variety of different known loads until a complete set of comparative information relative to the known load versus the detected load is established. This comparative information may be stored in the form of a Data Table (see 520 of FIG. 5). Ultimately, an algorithm particular to the load cell 100 may be established which may later be used for enhanced real-time calibration of load cell data provided by the load cell 100 during an application (see 580 of FIG. 5).

Once established, the above described data table and/or algorithm developed therefrom, may be stored and employed at a computer program of the control unit 154 of FIG. 1 or other information processing mechanism for later repeatable use. In fact, development of such a data table and/or algorithm as described above may be of particular benefit when applied to a dry downhole load cell 100 as depicted in FIG. 2. That is, given the closed environment of the load cell 100, readings obtained therefrom are likely to be fairly consistent as compared to a wet load cell 100 with deteriorating strain gauges bathed in oil. Thus, once the comparative information of the Data Table and algorithm are established for a given load cell 100, the data should remain fairly accurate throughout the life of the dry load cell 100. In this manner, reliable and repeatable use of the comparative information may be employed with the load cell 100 for numerous applications.

Figure 5:
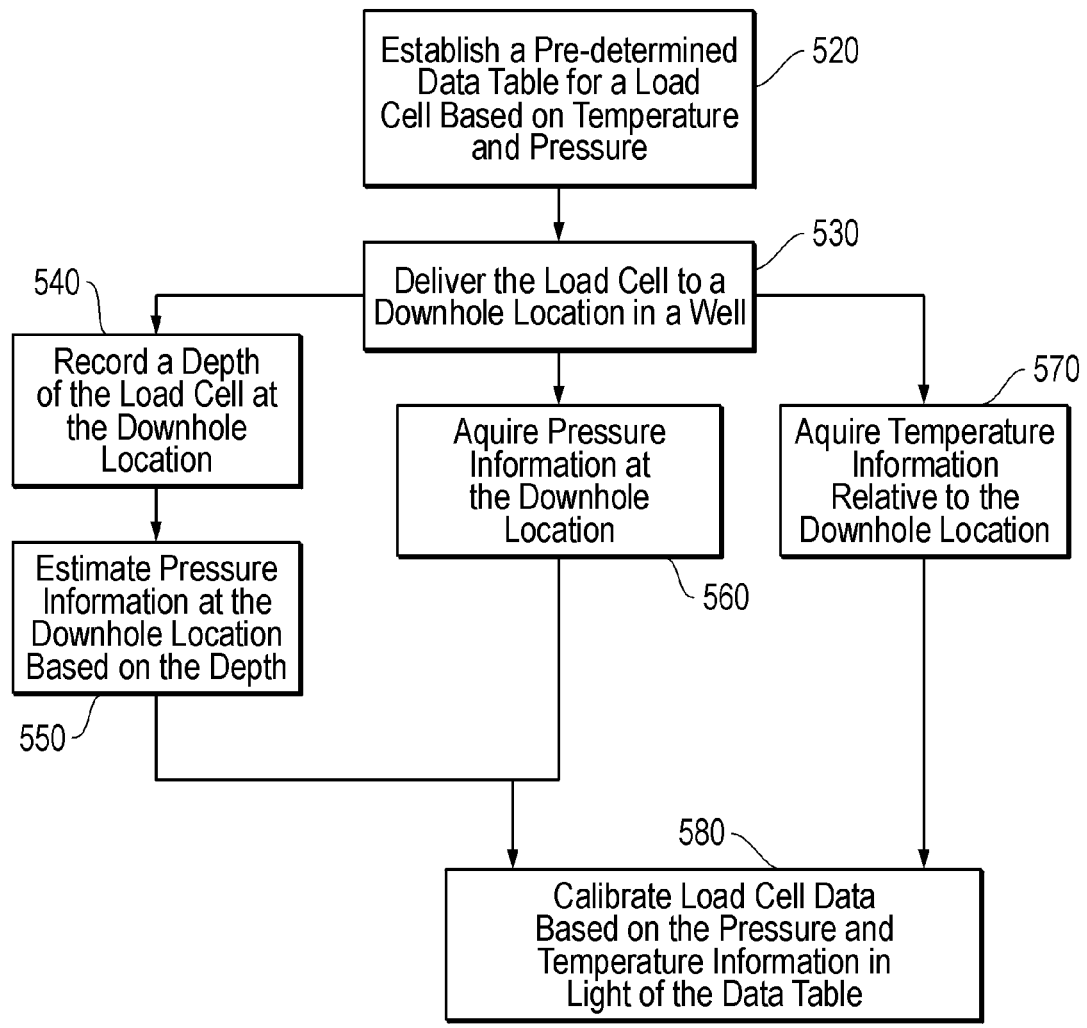
FIG. 5 is a flow-chart summarizing an embodiment of downhole load cell calibration.

Referring now to FIGS. 2 and 5, a method is described of employing the above referenced Data Table and algorithm developed therefrom, for enhancing the accuracy of downhole load information. That is, the Data Table may be established for a given load cell 100 as described above and at 520. This information may be stored at the control unit 154 or other processing mechanism as also indicated above. The load cell 100, as part of the larger logging head 125, may then be delivered to a downhole location by conventional wireline 155 and/or additional means as depicted in FIG. 1 and indicated at 530.

With the load cell 100 at the downhole location pressure and temperature information may be directly acquired as indicated at 560 and 570 by sensors at the logging head 125 (e.g. see thermometer housing 120), or the logging tool 160 as described below (see FIG. 4). This pressure and temperature information may then be routed to the processing mechanism and computer program for calibration of load data from the load cell 100 as indicated at 580. That is, calibration of load data may occur by application of the algorithm based on information obtained from the pre-determined Data Table as described above.

Application of the technique as described above may be applied in a dynamic and real-time fashion with the logging head moving in a downhole or uphole direction through any number of downhole locations or positions. The end result may effectively provide a downhole load cell 100 of substantially enhanced accuracy. Examples of this enhanced accuracy and benefits therefrom are depicted at FIG. 6 as well as FIGS. 3 and 4, which are also revisited below.

Continuing with reference to FIG. 5, with added reference to FIG. 1, an alternate manner of accounting for pressure information at the downhole location is described. Namely, in certain circumstances, an estimate of pressure information relative to the downhole location may be available as opposed to a direct pressure measurement. Nevertheless, this estimated pressure information may be employed for use in the above described calibration without significant impact on the enhanced accuracy of the load cell 100. So, for example, where a direct detection of pressure is unavailable, well pressure data may be estimated for any given downhole location, perhaps from a prior log of the well 180.

In an embodiment employing estimated pressure data, the surface load-measurement device 153 or other surface tool may include the additional capacity to meter the amount of wireline 155 disposed within the well 180. With such metering available, depth information relative to the logging head 125 may be recorded as it is positioned within the well 180 (see 540). As such, an estimate of pressure at a given downhole location may be made based on the depth as indicated at 550. Thus, even where no direct pressure information is available, the load cell 100 may be calibrated for enhanced accuracy as detailed above.

Figure 6:
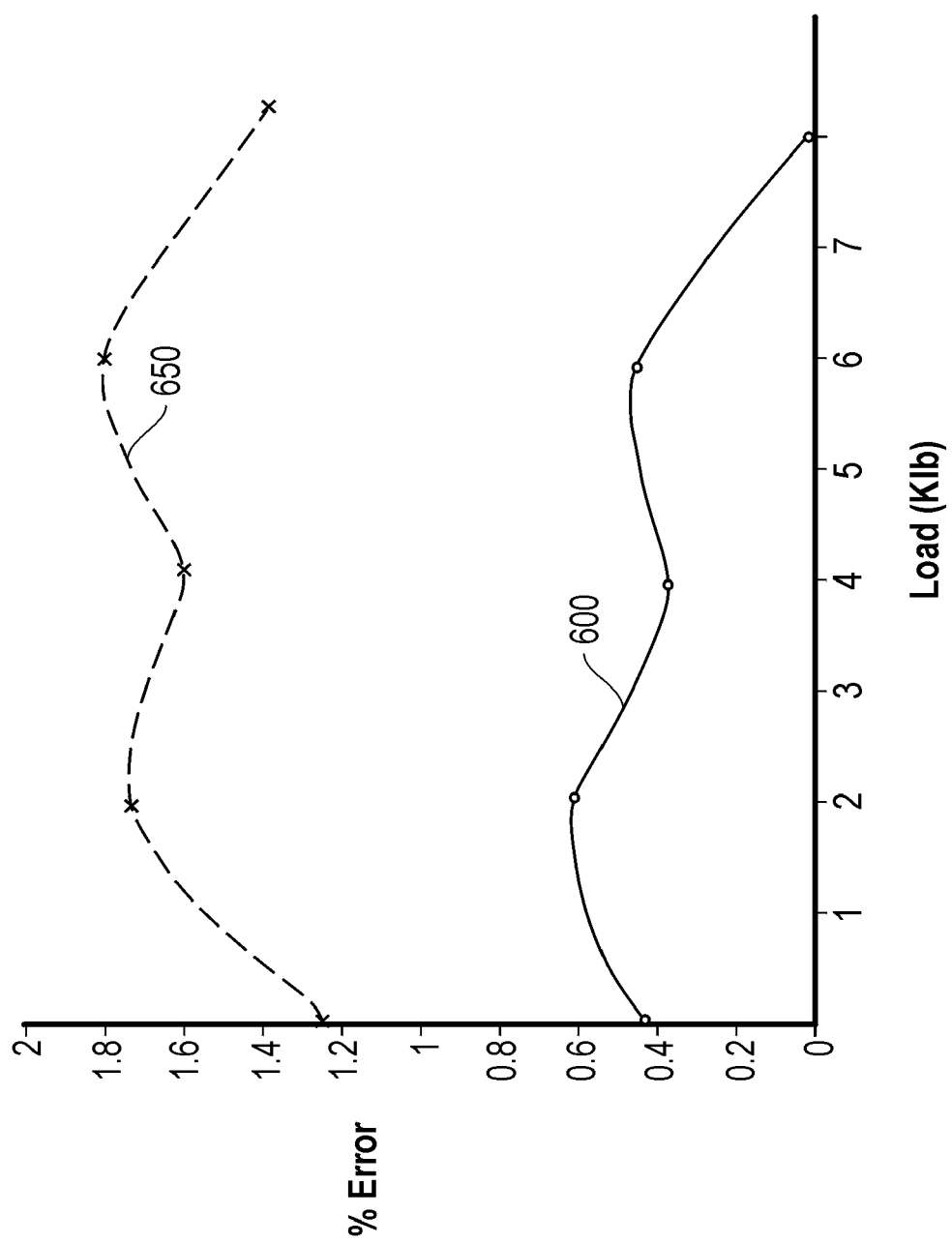
FIG. 6 is a chart reflecting downhole load cell accuracy when employing an embodiment of downhole load cell calibration.

Referring now to FIG. 6, a chart is depicted reflecting a degree of enhanced accuracy for a downhole load cell attained by employment of a calibration technique as described above. As shown in FIG. 6, the accuracy of a dry load cell, in terms of percent error, may be depicted over a range of various loads across the x-axis. With pre-defined constant conditions of pressure and temperature, say about 400° F. and about 20,000 lbs. of pressure, calibrated dry load cell readings 600 may be compared to un-calibrated readings 650. That is, over a range of up to about 8,000 pounds of load, a dry load cell calibrated according to techniques described hereinabove 600 reveals an accuracy improvement of between about one half to a full percent as compared to the same dry load cell left un-calibrated 650. Even a full percent improvement in accuracy may seem of small significance. However, this is far from the case. As described above, depending on the size of the load and load cell involved, this percentage enhancement in accuracy may represent a downhole load determination that is actually several hundred pounds of improved accuracy.

Referring back to FIG. 3 for a moment, with added reference to FIG. 2, the dramatic effect of attaining downhole load determinations that are improved by up to several hundred pounds may be illustrated in a practical sense. As shown in FIG. 3, the tractor 140 is configured to pull the logging head 125 and wireline 155 downhole. This may be achieved through the use of a piston 310 that is employed to alternatingly drive an uphole assembly 370 and a downhole assembly 380 through the well 180. In the embodiment shown, each assembly 370, 380 includes an anchor 375, 385 for interfacing the well wall 185 and an actuator 377, 387 therefor. Such a tractor 140 may be hydraulically driven and have the capacity for pulling or driving several thousand pounds of a load.

Given the above described load carrying capacity of the tractor 140, regular monitoring of the downhole load as indicated by the downhole load cell 100 may be of significance. For example, it is likely that the load carrying capacity of the tractor 140 may far exceed the tolerance built into the weakpoint 110 of the logging head 125. As such, in circumstances where the load indicated by the load cell 100 approaches the tolerance of the weakpoint 110, the tractor 140 may be directed to stop so as to avoid breakage of the weakpoint 110 in the logging head 125. In this manner, a subsequent fishing operation to retrieve tools left downhole may be avoided if alternate courses of action for dislodging the tools are available.

However, without substantially accurate load data, it is possible that the above described stopping of the logging operation has occurred unnecessarily. That is, inaccurate load data from the load cell 100 may indicate that a pull on the logging head 125 by the tractor 140 is approaching the load tolerance of the weakpoint 110 when, in fact, the load imparted by the tractor 140 remains several hundred pounds from the load tolerance of the weakpoint 110. In such circumstances, the logging operation has been halted even though breakage of the weakpoint 110 was not likely to occur. Thus, significant downtime and expense may be incurred based on the inaccurate load data. However, calibration techniques on a dry load cell 100 as described hereinabove may be employed to substantially reduce the likelihood of such unnecessary halting of downhole operations.

With brief additional reference to FIG. 4, the logging tool 160 may be coupled to the tractor 140 by a downhole tool coupling 355. With the ability to continue the operation as described above, the logging tool 160 may proceed through the well 180 to obtain information relative to the formation 190. In the embodiment shown, the logging tool 160 may include a saturation implement 420 to establish fluid flow information, an imaging implement 440, an accelerometer, and other implements for attaining downhole information. These implements may be utilized as the logging application proceeds in a relatively continuous manner without undue risk of stoppage based on substantially inaccurate load cell data.

The calibration techniques described above may be particularly well suited for use with a dry load cell as described. However, in other embodiments, these techniques may be used with other load cell types, including wet load cells in order to enhance accuracy of load data acquired therefrom. Additionally, the techniques described may provide enhanced accuracy of load cells to within less than about 3% error, regardless of load cell type. As a result, load cells and techniques described herein may be particularly well suited for larger load applications and deeper hydrocarbon wells.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, the well access assembly line for delivering of downhole tools may include a wireline as detailed herein or coiled tubing. As such, measurements of load provided by the load cell may constitute either tension or compression. Furthermore, the foregoing description should not be read as pertaining only to the precise structures described and shown in the accompanying drawings, but rather should be read as consistent with and as support for the following claims, which are to have their fullest and fairest scope.

I claim:

1. A method of determining a calibrated load on a well access assembly line at a downhole location in a well at an oilfield, the method comprising:
   delivering a dry downhole load cell to the downhole location with the well access assembly line;
   acquiring downhole temperature information from the downhole location;
   supplying downhole pressure information relative to the downhole location; and
   calibrating downhole load data detected by the downhole load cell at the downhole location based on pre-determined data relative to the downhole load cell.

2. The method of claim 1 further comprising:
   applying a known load to the downhole load cell;
   exposing the downhole load cell to a known temperature;
   subjecting the downhole load cell to a known pressure;
   recording a detected load indicated by the downhole load cell based on the known temperature and the known pressure; and
   comparing the known load to the detected load to establish the pre-determined data.

3. The method of claim 1 wherein the pre-determined data is stored as one of a data table and an algorithm.

4. The method of claim 1 further comprising:
   determining a depth of the downhole location; and
   estimating the downhole pressure information based on the depth.

5. The method of claim 4 wherein the well access assembly line includes a delivery mechanism coupled to the downhole load cell for the delivering and to surface equipment at the oilfield, said determining comprising metering the delivery mechanism with the surface equipment during the delivering.

6. The method of claim 1 wherein said calibrating provides an accuracy to within about +/−3%.

7. The method of claim 1 further comprising obtaining logging information relative to the downhole location with a logging tool of the well access assembly line.

8. The method of claim 1 wherein the well access assembly line includes a downhole tractor, the method further comprising tractoring the well access assembly line to the downhole location with the tractor.

9. The method of claim 1 wherein delivering comprises delivering a downhole load cell to the downhole location with one of a wireline and coiled tubing.

10. The method of claim 1 wherein delivering comprises delivering a downhole load cell comprising a load cell chamber, axial strain gauges mounted to said load cell chamber, and transverse strain gauges mounted to said load cell chamber.

11. The method of claim 1 wherein calibrating comprises calibrating the downhole load data with surface equipment positioned at a surface of the oilfield.

12. The method of claim 11 wherein said surface equipment comprises a control unit for housing the computer program, storing the pre-determined data, and obtaining the temperature and pressure information.

13. The method of claim 12 further comprising a surface load measurement device coupled to said control unit to acquire surface load data from a delivery mechanism at the surface of the oilfield.

14. The method of claim 12 wherein the pre-determined data is stored at the surface equipment as one of a data table and an algorithm.

15. The method of claim 1 wherein delivering further comprises delivering a logging head coupled to the well access assembly line and a weakpoint assembly built into said logging head, said weakpoint assembly to allow de-coupling from said well access line based on a pre-determined amount of load thereat.

16. The method of claim 15 wherein said logging head is configured to retain said downhole load cell.

* * * * *